(12) United States Patent
Ma

(10) Patent No.: US 11,402,700 B2
(45) Date of Patent: Aug. 2, 2022

(54) DISPLAY PANEL HAVING PIXEL UNITS ON TRANSITION AREA

(71) Applicant: WUHAN CHINA STAR OPTOELECTRONICS TECHNOLOGY CO., LTD., Wuhan (CN)

(72) Inventor: Guizhi Ma, Wuhan (CN)

(*) Notice: Subject to any disclaimer, the term of this patent is extended or adjusted under 35 U.S.C. 154(b) by 166 days.

(21) Appl. No.: 16/770,624

(22) PCT Filed: Dec. 12, 2019

(86) PCT No.: PCT/CN2019/124889
§ 371 (c)(1),
(2) Date: Jun. 8, 2020

(87) PCT Pub. No.: WO2021/103159
PCT Pub. Date: Jun. 3, 2021

(65) Prior Publication Data
US 2021/0405464 A1 Dec. 30, 2021

(30) Foreign Application Priority Data
Nov. 26, 2019 (CN) .......................... 201911172440.4

(51) Int. Cl.
G02F 1/1343 (2006.01)
G02F 1/1335 (2006.01)
H04N 5/225 (2006.01)
H04M 1/02 (2006.01)

(52) U.S. Cl.
CPC .. G02F 1/134309 (2013.01); G02F 1/133514 (2013.01); H04M 1/0264 (2013.01); H04N 5/2257 (2013.01)

(58) Field of Classification Search
CPC .......... G02F 1/133514; H04M 1/0264; H04N 5/2257
See application file for complete search history.

(56) References Cited

U.S. PATENT DOCUMENTS

2013/0083092 A1* 4/2013 Shin ..................... G09G 3/3607 345/690
2020/0135148 A1* 4/2020 Bai .......................... G09G 3/20
2020/0312832 A1* 10/2020 Chi .......................... G09G 3/20

* cited by examiner

*Primary Examiner* — Jessica M Merlin

(57) ABSTRACT

A display panel, which includes a display area, a transition area, and a blind hole area. The transition area is provided with a plurality of pixel units, and each of the plurality of pixel units comprises a blue sub-pixel, a red sub-pixel, and a green sub-pixel; wherein in the transition area, an aperture ratio of each of the red sub-pixels and an aperture ratio of each of the green sub-pixels are both less than an aperture ratio of each of the blue sub-pixels.

13 Claims, 4 Drawing Sheets

DISPLAY PANEL HAVING PIXEL UNITS ON TRANSITION AREA

FIELD OF INVENTION

The present disclosure relates to the field of display technologies, and more particularly, to a display panel and a display device.

BACKGROUND OF INVENTION

At present, mobile electronic devices such as mobile phones have been widely used in daily work and life, becoming a necessity for people to carry with them.

Under current trend, full screen technology is proposed to increase an effective display area and improve aesthetics. Although mobile phone manufacturers have proposed various solutions, opening a blind hole on a front of display devices remains a difficult problem that has yet to be solved. In order to achieve true full-screen, mobile phone manufacturers are actively researching and developing under-screen camera technology.

In order to reduce deformation of glass of a blind hole area, current blind hole displays usually adopt a design that increases density of support pillars at an edge of the blind hole, or a support wall design. However, these types of designs have a seesaw effect, that is, an increase of thickness of a liquid crystal cell of the display area around the blind hole causes a problem of yellowish display in the display area around the blind hole area.

If a smooth transition method is adopted to make a distribution density of the support pillars at the edge of the blind hole close to that in a plane, the deformation of the blind hole cannot be effectively prevented, and will cause problems such as large Newton ring fluctuation.

Therefore, it is necessary to provide a new display panel and a new display device to overcome the problems in the prior art.

SUMMARY OF INVENTION

The object of the present disclosure is to provide a display panel and a display device, which solve the problem of yellowish display in the display area around the blind hole area, make the colors of the two areas similar, and make it impossible for human eyes to distinguish the difference in brightness. In addition, ensuring enough supporting columns around the blind hole area, thereby reducing the deformation of the blind hole area, and effectively preventing the problem of Newton ring fluctuation.

To achieve the above object, the present disclosure provides a display panel including a display area, a blind hole area, and a transition area disposed around the blind hole area; wherein the transition area is provided with a plurality of pixel units arranged in an array, and each of the plurality of pixel units comprises a blue sub-pixel, a red sub-pixel, and a green sub-pixel; and wherein in the transition area, an aperture ratio of each of the red sub-pixels and an aperture ratio of each of the green sub-pixels are both less than an aperture ratio of each of the blue sub-pixels.

Further, wherein in the transition area, in a case that the aperture ratios of each of the red sub-pixels and each of the green sub-pixels are constant, the aperture ratios of the plurality of blue sub-pixels gradually increases from the display area toward the blind hole area.

Further, in the transition area, in a case that the aperture ratio of each of the blue sub-pixels is constant, the aperture ratios of the plurality of red sub-pixels and the plurality of green sub-pixels are gradually decrease from the display area toward the blind hole area.

Further, in the transition area, an area of each of the red sub-pixels and an area of each of the green sub-pixels are both smaller than an area of each of the blue sub-pixels.

Further, in the transition area, in a case that an area of each of red sub-pixels and an area of each of green sub-pixels are both constant, areas of the plurality of blue sub-pixels are gradually increase from the display area toward the blind hole area.

Further, in a case that an area of each of the blue sub-pixels is constant, areas of the plurality of red sub-pixels and areas of the plurality of green sub-pixels are gradually decrease from the display area to the blind hole area.

Further, in a case that an area of each of the red sub-pixels and an area of each of the green sub-pixels are both constant, widths of the plurality of blue sub-pixels are gradually increase from the display area toward the blind hole area.

Further, the display panel further comprising a plurality color filter layers disposed corresponding to the plurality of pixel units, each of the color filter layers comprising a blue filter layer, a red filter layer, and a green filter layer respectively corresponding to the blue sub-pixel, the red sub-pixel, and the green sub-pixel, and having equal areas.

Further, the pixel unit further comprises a plurality of pixel electrode disposed in a fence type, a distribution density of the plurality of pixel electrodes of the plurality blue sub-pixels gradually decreases from the display area toward the blind hole area.

Further, the pixel unit further comprises a plurality of pixel electrodes disposed in a fence type, widths of the plurality of pixel electrodes of the plurality blue sub-pixels are gradually decrease from the display area toward the blind hole area.

Further, the pixel unit further comprises a plurality of pixel electrodes disposed in a fence type; widths of the plurality of pixel electrodes of the plurality of red sub-pixels and the plurality of green sub-pixels are gradually increase from the display area toward the blind hole area.

Further, the width of the transition region ranges from 1 mm to 10 mm.

The present disclosure also provides a display device including the above display panel.

The technical effect of the present disclosure is to provide a display panel and a display device, wherein in the transition area, an aperture ratio of each of the red sub-pixels and an aperture ratio of each of the green sub-pixels are both less than an aperture ratio of each of the blue sub-pixels, thereby solving the problem of yellowish display in the display area around the blind hole area, making the colors of the two areas similar, and making it impossible for human eyes to distinguish the difference in brightness. In addition, it ensures that there are sufficient supporting columns around the blind hole area, thereby reducing the deformation of the blind hole area and effectively preventing the problem of Newton ring fluctuation.

DESCRIPTION OF DRAWINGS

To more clearly illustrate the embodiments of the present disclosure or the technical solutions in the prior art, the figures used in the embodiments of the present disclosure or the description of the prior art will be briefly described below. Obviously, the figures in the following description are only for some embodiments of the present disclosure, and those of ordinary skill in the art may also obtain other figures according to these figures without inventive steps.

DETAILED DESCRIPTION OF PREFERRED EMBODIMENTS

Figure 1:
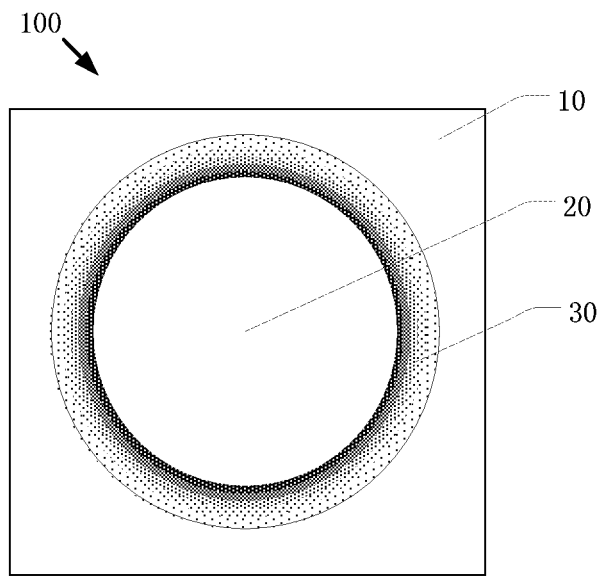
FIG. 1 is a schematic structural diagram of a display panel of a first embodiment of the present disclosure.

The following is a description of each embodiment with reference to additional figures to illustrate specific embodiments in which the present disclosure can be implemented. The directional terms mentioned in the present disclosure, such as up, down, front, back, left, right, inside, outside, side, etc., are only directions referring to the figures. The names of the elements mentioned in the present disclosure, such as first, second, etc., are only used to distinguish different components, which can be better expressed. In the figure, similarly structured units are denoted by the same reference numerals.

In the present disclosure, the terms "installation", "linked", "connected", "fixed" and other terms shall be understood in a broad sense unless specified and defined limit, for example, they may be fixed connections or removable connections, or integrated; it can be mechanical or electrical connection; it can be directly connected or indirectly connected through an intermediate component; it can be an internal connection of the two elements or the interaction between the two elements. For those of ordinary skill in the art, the specific meanings of the above terms in the present disclosure can be understood according to specific situations.

Embodiment 1

Referring to FIG. 1, a first embodiment of the present disclosure provides a display panel 100 including a display area 10, a blind hole area 20, and a transition area 30 disposed around the blind hole area 20. The blind hole area 20 is disposed corresponding to a sensor (not shown in the figure), wherein the sensor includes one or a combination of a camera sensor, a breathing light sensor, a distance sensor, a fingerprint scanner sensor, a microphone sensor, or a transparent antenna sensor. In one embodiment, the sensor is preferably a camera sensor. An innermost side of the transition area 30 coincides with an outermost side of the blind hole area 20, and an outermost side of the transition area 30 coincides with an innermost side of the display area 10.

Figure 2:
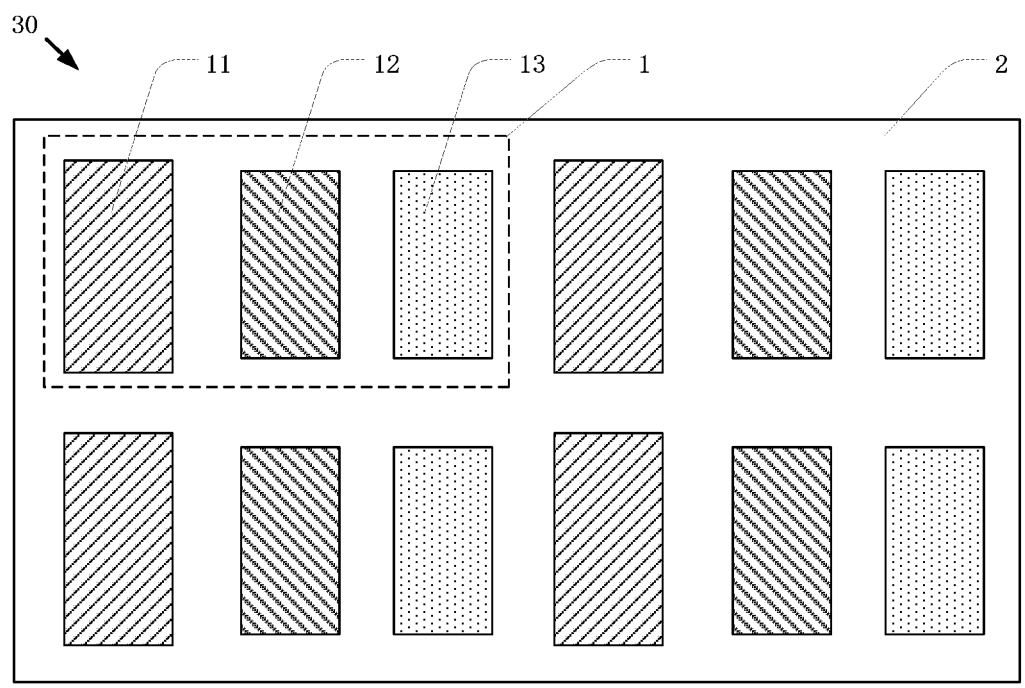
FIG. 2 is a schematic planar structural diagram of a transition region of the first embodiment of the present disclosure.

Please refer to FIG. 2, which is a schematic planar structural diagram of the transition area 30. The transition area 30 is provided with a plurality of pixel units 1 arranged in an array, and each of the plurality of pixel units 1 includes a blue sub-pixel 11, a red sub-pixel 12, and a green sub-pixel 13.

In order to reduce deformation of glass in the blind hole area, support pillars are disposed in the transition area 30 around the blind hole area 20, and a distribution density of the support pillars gradually increases from the display area 10 toward the transition area 30, so that the display around the blind hole area 20 shown in FIG. 1 also gradually turn yellowish.

In order to relieve the problem of display around the blind hole area 20 gradually turning yellowish, in this embodiment, in the transition area 30, an aperture ratio of each of the red sub-pixels 12 and an aperture ratio of each of the green sub-pixels 13 are both less than an aperture ratio of each of the blue sub-pixels 11. In this embodiment, the aperture ratios of the red sub-pixel 12 and the green sub-pixel 13 are preferably the same, in this way, a color of the display around the blind hole area 20 is similar to a color of the display of the display area 10, which can both solve the problem of yellowish display around the blind hole area 20 and satisfy the requirement of providing high distribution density of support columns around the blind hole area 20, that is, the transition area 30, thereby reducing the deformation of the blind hole area 20, and effectively preventing the problem of Newton ring fluctuation.

In order to relieve the problem of display around the blind hole area 20 gradually turning yellowish, in this embodiment, wherein in the transition area 30, in a case that the aperture ratios of each of the red sub-pixels 12 and each of the green sub-pixels 13 are constant, the aperture ratios of the plurality of blue sub-pixels 11 gradually increase from the display area 10 toward the blind hole area 20; or, wherein in the transition area 30, in a case that the aperture ratio of each of the blue sub-pixels 11 is constant, the aperture ratios of the plurality of red sub-pixels 12 and the plurality of green sub-pixels 13 gradually decrease from the display area 10 toward the blind hole area 20.

In this embodiment, corresponding aperture ratios are adjusted by adjusting areas of the blue sub-pixels 11, the red sub-pixels 12, and the green sub-pixels 13 of the transition area 30. Specifically, in the same pixel unit 1 of the transition area 30, an area of the red sub-pixel 12 and an area of the green sub-pixel 13 are both smaller than an area of the blue sub-pixel 11.

Please refer to FIG. 2. In this embodiment, the display panel 100 further includes a black matrix layer 2. The pixel unit 1 is disposed in a grid of the black matrix layer 2 and penetrates the black matrix layer 2, that is, the pixel unit 1 and the black matrix layer 2 are located in a same layer. Through adjusting a width of the black matrix layer 2, areas of the blue sub-pixel 11, the red sub-pixel 12, and the green sub-pixel 13 of the pixel unit 1 can be adjusted.

Specifically, one embodiment is that wherein in the transition area 30, in a case that an area of each of the red sub-pixels 12 and an area of each of the green sub-pixels 13 are both constant, areas of the plurality of blue sub-pixels 11 are gradually increased from the display area 10 toward the blind hole area 20. That is, a width of the black matrix layer 2 located in the blue sub-pixel 11 gradually decreases from the display area 10 toward the blind hole area 20.

Specifically, in another embodiment, wherein in the transition area 30, in a case that an area of each of the blue sub-pixels 11 is constant, areas of the plurality of red sub-pixels 12 and areas of the plurality of green sub-pixels 13 are gradually decreased from the display area 10 to the blind hole area 20. That is, a width of the black matrix layer 2 located in the red sub-pixel 12 and the green sub-pixel 13 gradually increases from the display area 10 toward the blind hole area 20.

It can be understood that the above two embodiments may exist alone or in combination with each other.

In this embodiment, through disposing the red sub-pixels 12 and the green sub-pixels 13, each with an aperture ratio less than that of each of the blue sub-pixels 11, in the transition area 30, the problem of yellowish display in the display area 10 around the blind hole area 20 can be solved, making the colors of the two areas similar, and making it impossible for human eyes to distinguish the difference in brightness. In addition, it ensures that there are sufficient supporting columns around the blind hole area 20, thereby reducing the deformation of the blind hole area 20 and effectively preventing the problem of Newton ring fluctuation.

Further, in this embodiment, aperture ratios are adjusted through adjusting areas of the blue sub-pixels 11, the red sub-pixels 12, and the green sub-pixels 13 in the transition area 30. Therefore, wherein in the transition area 30, in a case that the aperture ratios of each of the red sub-pixels 12 and each of the green sub-pixels 13 are constant, the aperture ratios of the plurality of blue sub-pixels 11 gradually increases from the display area 10 toward the blind hole area 20; or, wherein in the transition area 30, in a case that the aperture ratio of each of the blue sub-pixels 11 is constant, the aperture ratios of the plurality of red sub-pixels 12 and the plurality of green sub-pixels 13 are gradually decreased from the display area 10 toward the blind hole area 20. By gradually increasing the brightness of blue light and decreasing the brightness of red and green light, the problem of the display around the blind hole area 20 gradually turning yellowish is relieved.

In this embodiment, the width of the transition area 30 ranges from 1 mm to 10 mm, that is, the distance between the innermost and outermost of the transition area 30 ranges from 1 mm to 10 mm. The transition area 30 has a certain width so that the color of the display between the display area 10 and the transition area 30 gradually changes, which is more conducive to solving the problem of the display of the transition area 30 around the blind hole area 20 being yellowish, thereby making the colors of the transition area 30 and the display area 10 similar.

Figure 3:
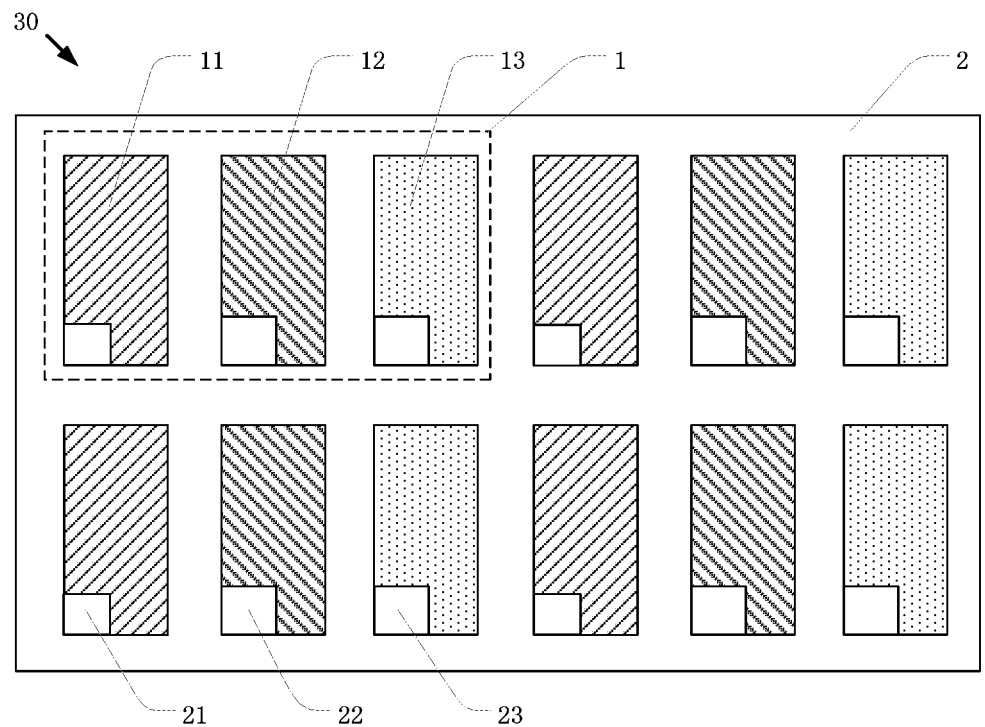
FIG. 3 is a schematic planar structural diagram of another transition area of the first embodiment of the present disclosure.

Please refer to FIG. 3. In other embodiments, the black matrix layer 2 further includes a plurality of thin-film transistor regions 21, 22, and 23. By adjusting areas of the first thin film transistor region 21, the second thin film transistor region 22, and the third thin film transistor region 23, which are respectively corresponding to the blue sub-pixels 11, the red sub-pixel 12, and the green sub-pixels 13, the areas of the blue sub-pixels 11, the red sub-pixels 12, and the green sub-pixel 13 of the pixel unit 1 can be adjusted. A manner of adjusting the areas of the thin film transistor regions 21, 22, and 23 can be regarded as a manner of adjusting the width of the black matrix layer 2. The width of the black matrix layer 2 and the areas of the blue sub-pixels 11, the red sub-pixels 12, and the green sub-pixels 13 of the pixel unit 1 are adjusted to achieve adjustment of the areas of the thin film transistor regions 21, 22, and 23, which is within the protection scope of the present disclosure.

Embodiment 2

Figure 4:
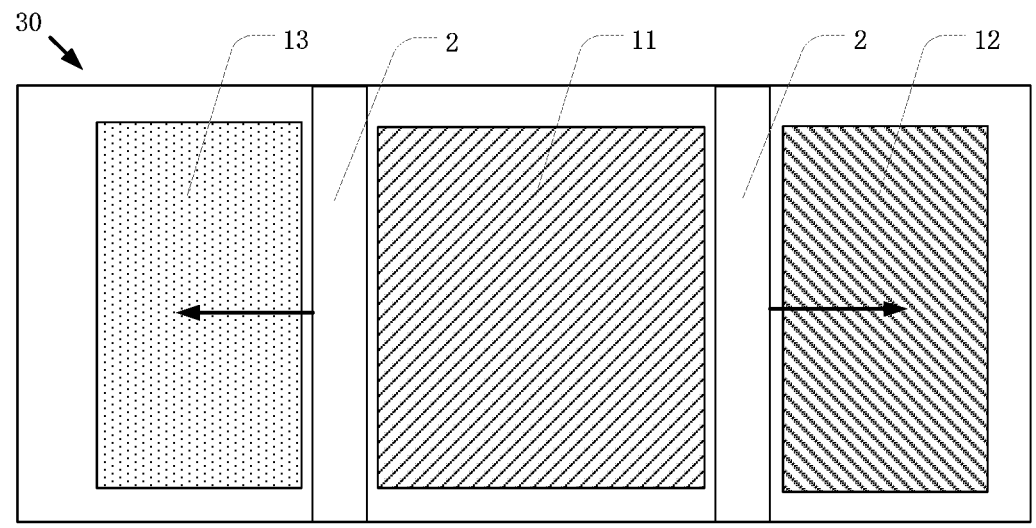
FIG. 4 is a schematic planar structural diagram of a transition region of a second embodiment of the present disclosure.

Referring to FIG. 4, a second embodiment includes most of the technical features of the first embodiment. The difference is that in the second embodiment, in a case that an area of each of the red sub-pixels 12 and an area of each of the green sub-pixels 13 are both constant, widths of the plurality of blue sub-pixels 11 are gradually increased from the display area 10 toward the blind hole area 20, causing the areas of the blue sub-pixels 11 located in the transition area 30 to gradually increase from the display area 10 toward the blind hole area 20. That is, when the width of the black matrix layer 2 adjacent to the blue sub-pixel 11 is constant, the black matrix layer 2 gradually compresses areas of the red sub-pixels 12 and the green sub-pixels 13 from the display area 10 toward the blind hole area 20. By gradually increasing the brightness of blue light and decreasing the brightness of red and green light, the problem of the display around the blind hole area 20 gradually turning yellowish is relieved.

Embodiment 3

Figure 5:
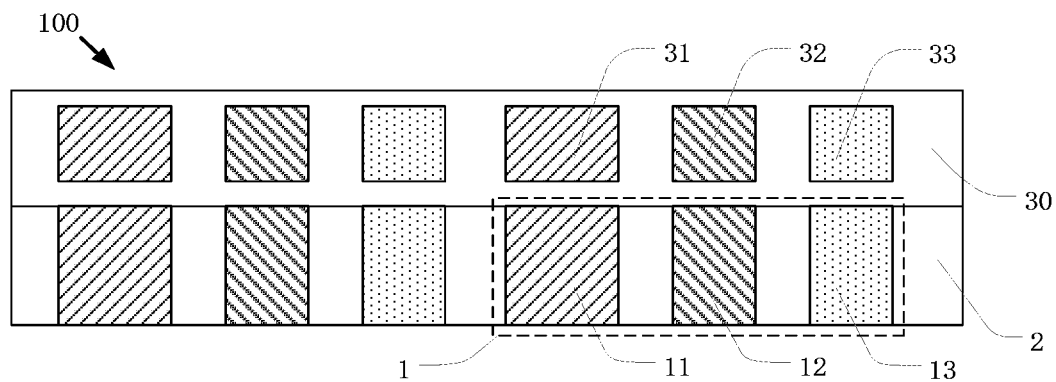
FIG. 5 is a schematic structural diagram of a display panel of a third embodiment of the present disclosure.

Referring to FIG. 5, a third embodiment includes most of the technical features of the first embodiment and the second embodiment. The difference is that the display panel 100 described in the third embodiment further includes a plurality of color filter layers 3 disposed corresponding to the plurality of pixel units 1 of the transition area 30. Each of the color filter layers 3 includes a blue filter layer 31, a red filter layer 32, and a green filter layer 33 respectively corresponding to the blue sub-pixel 11, the red sub-pixel 12, and the green sub-pixel 13, and having equal areas.

In this embodiment, through adjusting the areas of the blue filter layer 31, the red filter layer 32, and the green filter layer 33 located in the color filter layer 3, aperture ratios of the red filter layer 32 and the green filter layer 33 are both made to be smaller than the aperture ratio of the blue filter layer 31, thereby solving the problem of yellowish display in the display area 10 around the blind hole area 20, making the colors of the two areas similar, and making it impossible for human eyes to distinguish the difference in brightness. In addition, it ensures that there are sufficient supporting columns around the blind hole area 20, thereby reducing the deformation of the blind hole area 20 and effectively preventing the problem of Newton ring fluctuation.

Embodiment 4

Figure 6:
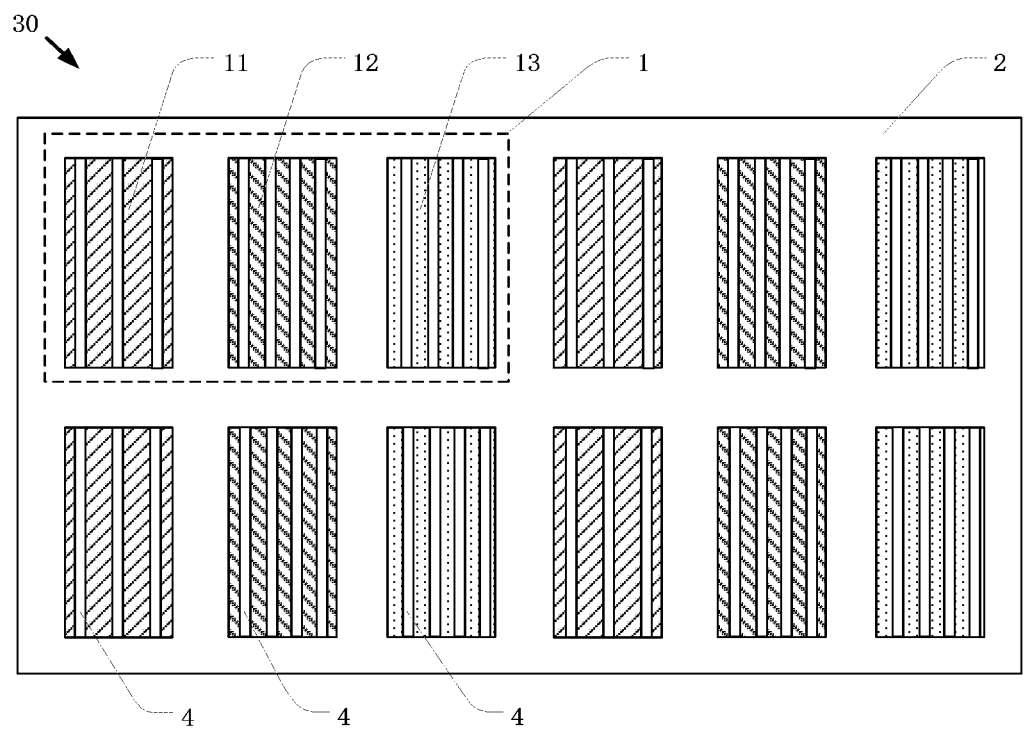
FIG. 6 is a schematic planar structural diagram of a transition region of a fourth embodiment of the present disclosure.

As shown in FIG. 6, a fourth embodiment includes most of the technical features of the first embodiment, the second embodiment, and the third embodiment. The difference is that the pixel unit 1 in the fourth embodiment further includes a plurality of pixel electrodes 4 are distributed in a fence form.

In this embodiment, through adjusting the distribution density of the pixel electrodes 4, that is, the number of unit areas of the pixel electrodes 4, gradual increases in the aperture ratios of the blue sub-pixels 11 located in the transition area 30 from the display area 10 toward the blind hole area 20 are achieved, or gradual decreases in the aperture ratios of the red sub-pixels 12 and the green sub-pixels 13 located in the transition area 30 from the display area 10 toward the blind hole area 20 are achieved. In the same pixel unit 1 of the transition area 30, a distribution density of the pixel electrodes 4 located in the blue sub-pixels 11 is less than a distribution density of the pixel electrodes 4 located in the red sub-pixel 12 and a distribution density of the pixel electrodes 4 located in the green sub-pixel 13. The distribution density of the plurality of pixel electrodes 4 of the plurality blue sub-pixels 11 gradually decreases from the display area 10 toward the blind hole area 20.

Figure 7:
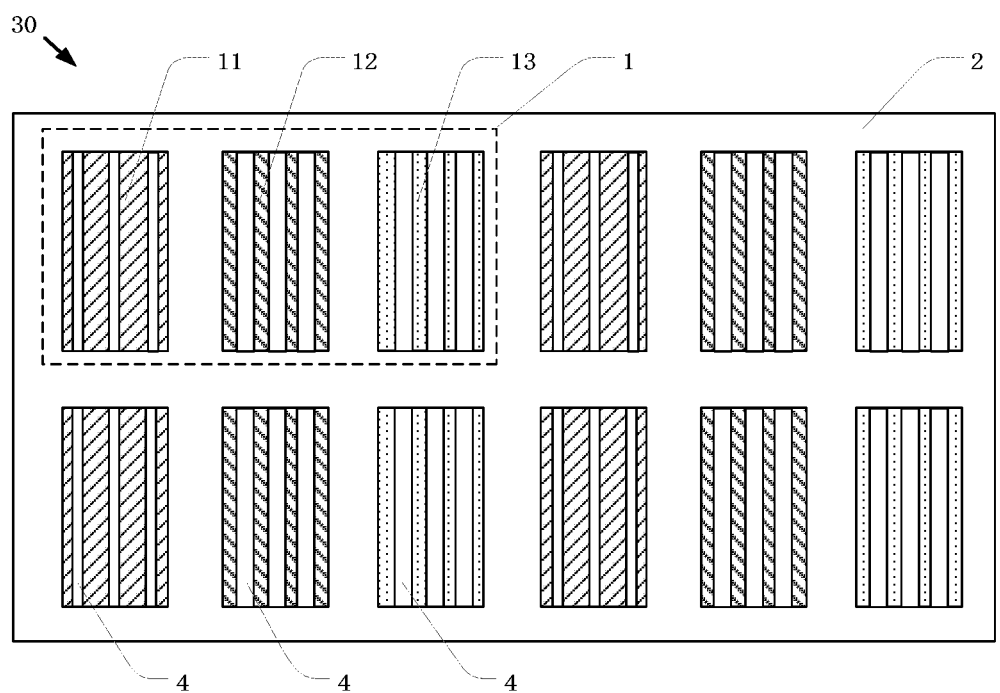
FIG. 7 is a schematic planar structural diagram of another transition region of the fourth embodiment of the present disclosure.

As shown in FIG. 7, in other embodiments, a width of the pixel electrode 4 may be adjusted to achieve the above-mentioned change in aperture ratio.

Specifically, one embodiment is that widths of the plurality of pixel electrodes 4 of the plurality blue sub-pixels 11 in the transition area 30 are gradually decreased from the display area 10 toward the blind hole area 20. This way, the aperture ratios of the plurality of blue sub-pixels 11 located in the transition area 30 are gradually increased from the display area 10 toward the blind hole area 20.

Specifically, another embodiment is that widths of the plurality of pixel electrodes 4 of the plurality of red sub-pixels 12 and the plurality of green sub-pixels 13 in the transition area 30 are gradually increased from the display area 10 toward the blind hole area 20. This way, the aperture ratios of the plurality of red sub-pixels 12 and the plurality of green sub-pixels 13 located in the transition area 30 are gradually reduced from the display area 10 toward the blind hole area 20.

It is worth noting that, in addition to the above two embodiments, as shown in FIG. 5, in the same pixel unit 1, a width of each of the plurality of pixel electrodes 4 of the plurality of blue sub-pixels 11 is less than a width of each of the plurality of pixel electrodes 4 of the plurality of red sub-pixels 12 and a width of each of the plurality of green sub-pixels 13; the width of the plurality of the pixel electrodes 4 of the plurality of blue sub-pixels 11 are gradually decreased from the display area 10 toward the blind hole area 20.

In this embodiment, through disposing the red sub-pixels 12 and the green sub-pixels 13, each with an aperture ratio less than that of each of the blue sub-pixels 11, in the transition area 30, the problem of yellowish display in the display area 10 around the blind hole area 20 can be solved, making the colors of the two areas similar, and making it impossible for human eyes to distinguish the difference in brightness. In addition, it ensures that there are sufficient supporting columns around the blind hole area 20, thereby reducing the deformation of the blind hole area 20 and effectively preventing the problem of Newton ring fluctuation.

The present disclosure further provides a display device including the display panel 100 described above.

The display device of the present disclosure can be applied to various occasions and can be combined with various devices and structures. The display device can be a mobile terminal including a cell phone, a smart wearable, or a fixed terminal including personal computer (PC), or other devices having a display device with a display function, such as tablets, TVs, display windows, etc. It should be noted that, in order to realize the function, the display device of the present disclosure is provided with other components, structures, etc., which are not shown in this specification.

The technical effect of the present disclosure is to provide a display panel 100 and a display device, wherein in the transition area 30, an aperture ratio of each of the red sub-pixels 12 and an aperture ratio of each of the green sub-pixels 13 are both less than an aperture ratio of each of the blue sub-pixels 11, thereby solving the problem of yellowish display in the display area 10 around the blind hole area 20, making the colors of the two areas similar, and making it impossible for human eyes to distinguish the difference in brightness. In addition, it ensures that there are sufficient supporting columns around the blind hole area 20, thereby reducing the deformation of the blind hole area 20 and effectively preventing the problem of Newton ring fluctuation.

In the figures, the thicknesses of layers and regions are exaggerated for clarity. For example, for convenience of description, the thicknesses and sizes of elements in the figures are arbitrarily shown, and therefore, the technical scope described is not limited by the figures.

Finally, it should be noted that in this specification, relational terms such as first and second are used only to distinguish one entity or operation from another entity or operation, and do not necessarily require or imply any such actual relationship or order between of these entities. Moreover, the terms "including," "comprising," or any other variation thereof are intended to encompass non-exclusive inclusion, such that a process, method, product, or device that includes a series of elements includes not only those elements but also those are not explicitly listed elements, or elements that are inherent to such processes, methods, goods, or equipment. Without more limitation, the elements defined by the sentence "including a . . . " do not exclude the existence of other identical elements in the process, method, product or equipment.

The above are only preferred embodiments of the present disclosure. It should be noted that, for those of ordinary skill in the art, without departing from the principle of the present disclosure, several improvements and retouches can be made, and these improvements and retouches are within the protection scope of the present disclosure.

What is claimed is:

1. A display panel, comprising a display area, a blind hole area, and a transition area disposed around the blind hole area;
    wherein the transition area is provided with a plurality of pixel units arranged in an array, and each of the plurality of pixel units comprises a blue sub-pixel, a red sub-pixel, and a green sub-pixel;
    wherein in the transition area, an aperture ratio of each of the red sub-pixels and an aperture ratio of each of the green sub-pixels are both less than an aperture ratio of each of the blue sub-pixels; and
    wherein in the transition area, the aperture ratios of each of the red sub-pixels and each of the green sub-pixels are constant, the aperture ratios of the plurality of blue sub-pixels gradually increase from the display area toward the blind hole area.

2. The display panel as claimed in claim 1, wherein in the transition area, an area of each of the red sub-pixels and an area of each of the green sub-pixels are both smaller than an area of each of the blue sub-pixels.

3. The display panel as claimed in claim 1, wherein in the transition area, an area of each of red sub-pixels and an area of each of green sub-pixels are both constant, areas of the plurality of blue sub-pixels gradually increase from the display area toward the blind hole area.

4. The display panel as claimed in claim 1, wherein an area of each of the blue sub-pixels is constant, areas of the plurality of red sub-pixels and areas of the plurality of green sub-pixels gradually decrease from the display area to the blind hole area.

5. The display panel as claimed in claim 1, wherein an area of each of the red sub-pixels and an area of each of the green sub-pixels are both constant, widths of the plurality of blue sub-pixels gradually increase from the display area toward the blind hole area.

6. The display panel as claimed in claim 1, further comprising a plurality color filter layers disposed corresponding to the plurality of pixel units, wherein each of the color filter layers comprises a blue filter layer, a red filter layer, and a green filter layer that respectively correspond to the blue sub-pixel, the red sub-pixel, and the green sub-pixel, and are equal in areas.

7. The display panel as claimed in claim 1, wherein the pixel unit further comprises a plurality of pixel electrodes disposed in a fence form, and a distribution density of the plurality of pixel electrodes of the plurality blue sub-pixels gradually decreases from the display area toward the blind hole area.

8. A display panel, comprising a display area, a blind hole area, and a transition area disposed around the blind hole area;
   wherein the transition area is provided with a plurality of pixel units arranged in an array, and each of the plurality of pixel units comprises a blue sub-pixel, a red sub-pixel, and a green sub-pixel;
   wherein in the transition area, an aperture ratio of each of the red sub-pixels and an aperture ratio of each of the green sub-pixels are both less than an aperture ratio of each of the blue sub-pixels; and
   wherein the pixel unit further comprises a plurality of pixel electrodes disposed in a fence form, and widths of the plurality of pixel electrodes of the plurality blue sub-pixels gradually decrease from the display area toward the blind hole area.

9. The display panel as claimed in claim 8, wherein in the transition area, the aperture ratios of each of the red sub-pixels and each of the green sub-pixels are constant, the aperture ratios of the plurality of blue sub-pixels gradually increase from the display area toward the blind hole area.

10. The display panel as claimed in claim 8, wherein in the transition area, the aperture ratio of each of the blue sub-pixels is constant, the aperture ratios of the plurality of red sub-pixels and the plurality of green sub-pixels gradually decrease from the display area toward the blind hole area.

11. A display panel, comprising a display area, a blind hole area, and a transition area disposed around the blind hole area;
   wherein the transition area is provided with a plurality of pixel units arranged in an array, and each of the plurality of pixel units comprises a blue sub-pixel, a red sub-pixel, and a green sub-pixel;
   wherein in the transition area, an aperture ratio of each of the red sub-pixels and an aperture ratio of each of the green sub-pixels are both less than an aperture ratio of each of the blue sub-pixels; and
   wherein the pixel unit further comprises a plurality of pixel electrodes disposed in a fence form, and widths of the plurality of pixel electrodes of the plurality of red sub-pixels and the plurality of green sub-pixels gradually increase from the display area toward the blind hole area.

12. The display panel as claimed in claim 11, wherein in the transition area, the aperture ratios of each of the red sub-pixels and each of the green sub-pixels are constant, the aperture ratios of the plurality of blue sub-pixels gradually increase from the display area toward the blind hole area.

13. The display panel as claimed in claim 11, wherein in the transition area, the aperture ratio of each of the blue sub-pixels is constant, the aperture ratios of the plurality of red sub-pixels and the plurality of green sub-pixels gradually decrease from the display area toward the blind hole area.

* * * * *